United States Patent
Kim et al.

(10) Patent No.: US 12,483,741 B2
(45) Date of Patent: Nov. 25, 2025

(54) PORTABLE DISPLAY DEVICE AND CONTROL METHOD FOR THE SAME

(71) Applicant: LG ELECTRONICS INC., Seoul (KR)

(72) Inventors: Yunam Kim, Seoul (KR); Sinan Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 18/383,290

(22) Filed: Oct. 24, 2023

(65) Prior Publication Data

US 2024/0348883 A1    Oct. 17, 2024

(30) Foreign Application Priority Data

Apr. 13, 2023  (KR) .................. 10-2023-0048626
Jul. 3, 2023   (KR) .................. 10-2023-0085831

(51) Int. Cl.
*H04N 21/414* (2011.01)
*H04N 5/64* (2006.01)
*H04N 21/472* (2011.01)

(52) U.S. Cl.
CPC ......... *H04N 21/41407* (2013.01); *H04N 5/64* (2013.01); *H04N 21/47217* (2013.01)

(58) Field of Classification Search
CPC ............... H04N 21/41407; H04N 5/64; H04N 21/47217; H04N 5/65; H04N 21/4621; H04N 21/47202
See application file for complete search history.

(56) References Cited

U.S. PATENT DOCUMENTS

| | | | |
|---|---|---|---|
| 9,208,765 B1 | 12/2015 | Sivertsen | |
| 9,734,865 B2 * | 8/2017 | Hosoe | H04N 23/667 |
| 9,899,003 B2 | 2/2018 | Sin et al. | |

(Continued)

FOREIGN PATENT DOCUMENTS

| | | | | |
|---|---|---|---|---|
| CN | 102421018 A | | 4/2012 | |
| CN | 111726666 A | * | 9/2020 | H04N 21/4312 |

(Continued)

OTHER PUBLICATIONS

CN 113141529 English translation (Year: 2021).*

(Continued)

*Primary Examiner* — John R Schnurr
(74) *Attorney, Agent, or Firm* — Birch, Stewart, Kolasch & Birch, LLP

(57) ABSTRACT

Disclosed herein is a portable display device. The portable display device may include: a display; and a controller. The controller is configured to: store a storage path of a first video and a storage path of a second video, wherein the first and second videos are related to at least two rotation states of the display; detect a change in a rotation state of the display during playback of the first video; store a video playback time at a moment at which the rotation state of the display changes; pause the playback of the first video that is currently playing; and control the second video to be played at a playback start time based on the storage path of the second video related to the detected rotation state, wherein the playback start time is determined based on the stored video playback time.

15 Claims, 11 Drawing Sheets

(56) References Cited

U.S. PATENT DOCUMENTS

| | | | |
|---|---|---|---|
| 10,607,634 B1 | 3/2020 | Lavoie | |
| 12,254,231 B2* | 3/2025 | Choi | G09G 3/035 |
| 2010/0318204 A1 | 12/2010 | Daisy | |
| 2011/0029867 A1 | 2/2011 | Park | |
| 2011/0058056 A1 | 3/2011 | Lindahl et al. | |
| 2011/0169728 A1* | 7/2011 | Huang | G09G 5/003 |
| | | | 345/698 |
| 2013/0132838 A1 | 5/2013 | Daisy | |
| 2014/0033050 A1 | 1/2014 | Shin et al. | |
| 2014/0307001 A1* | 10/2014 | Aizawa | G09G 3/20 |
| | | | 345/659 |
| 2015/0022558 A1 | 1/2015 | Li | |
| 2015/0059998 A1 | 3/2015 | Zhao et al. | |
| 2015/0186029 A1 | 7/2015 | Khan | |
| 2018/0146224 A1* | 5/2018 | Park | H04N 21/8133 |
| 2019/0042648 A1 | 2/2019 | Jehan | |
| 2019/0287553 A1 | 9/2019 | Byerly | |
| 2019/0332191 A1 | 10/2019 | Jeng et al. | |
| 2020/0026419 A1* | 1/2020 | Jang | G06F 3/013 |
| 2021/0051316 A1* | 2/2021 | Li | H04N 21/47217 |
| 2021/0051355 A1* | 2/2021 | Li | H04N 21/44218 |
| 2021/0082382 A1 | 3/2021 | Pinhas | |
| 2022/0277041 A1 | 9/2022 | Paul | |
| 2022/0417660 A1 | 12/2022 | Wilberding et al. | |
| 2023/0162321 A1* | 5/2023 | Seo | H04N 7/01 |
| | | | 345/428 |
| 2025/0021284 A1* | 1/2025 | Choi | G06F 3/14 |
| 2025/0123612 A1 | 4/2025 | Alfano et al. | |

FOREIGN PATENT DOCUMENTS

| | | | | |
|---|---|---|---|---|
| CN | 113141529 A | * | 7/2021 | ......... H04N 21/4104 |
| EP | 2 275 957 A1 | | 1/2011 | |
| JP | 2003-249984 A | | 9/2003 | |
| JP | 2004-198759 A | | 7/2004 | |
| JP | 2008-53629 A | | 2/2006 | |
| JP | 2008-254350 A | | 8/2006 | |
| JP | 2006254350 A | * | 9/2006 | |
| JP | 2008-242263 A | | 10/2008 | |
| JP | 2022-164895 A | | 10/2022 | |
| KR | 10-2008-0064331 A | | 7/2008 | |
| KR | 10-2011-0012125 A | | 2/2011 | |
| KR | 10-2011-0122557 A | | 11/2011 | |
| KR | 10-2015-0059998 A | | 6/2015 | |
| KR | 10-2018-0057473 A | | 5/2018 | |
| KR | 10-1870722 B1 | | 6/2018 | |
| KR | 10-2021-0009189 A | | 1/2021 | |
| KR | 10-2022-0063471 A | | 5/2022 | |
| KR | 10-2023-0049414 A | | 4/2023 | |
| WO | 2019/176517 A1 | | 9/2019 | |

OTHER PUBLICATIONS

The Sound Test Room, Vinyl . . . iPad Record Player . . . The Coolest Way to Listen to Music on Your iPad (9:15 mins), uploaded Sep. 10, 2013, <https://www.youtube.com/watch?v=8leOYocOGSs>.

The DeviceBlog, Must Have IOS 14 App: Vinyls—Record Playing Music App With A Spinning Record (3:29 mins), uploaded Mar. 16, 2021, <https://www.youtube.com/watch?v=TDaSWCZBs9U>.

U.S. Office Action for U.S. Appl. No. 18/673,944, dated May 1, 2025.

* cited by examiner (a)

(b)

(c)

(d)

PORTABLE DISPLAY DEVICE AND CONTROL METHOD FOR THE SAME

This application claims the benefit of Korean Patent Application Nos. 10-2023-0048626, filed on Apr. 13, 2023, and 10-2023-0085831, Jul. 3, 2023, which is hereby incorporated by reference as if fully set forth herein.

BACKGROUND

Technical Field

The present disclosure relates to a portable display device and control method for the same.

Discussion of the Related Art

Recently, in multimedia devices such as a mobile phone and a television (TV), a new form factor is being discussed. The form-factor refers to a structured form of a product.

The reason why form-factor innovation is emerging as important in a display industry is because of increasing needs of a user for the form-factor that may be used freely and conveniently regardless of a use situation departing from a typical form-factor customized for a specific use environment in the past, resulted from an increase in consumer mobility, convergence between devices, a rapid progress in smartization, and the like.

For example, vertical TVs are expanding, breaking the stereotype that the TVs are viewed horizontally. The vertical TV is a product that allows the user to change a direction of a screen by reflecting characteristics of the Millennials and Gen Z who are accustomed to enjoying content on mobile. The vertical TVs are convenient because a social media or a shopping site image may be viewed easily and comments may be read while watching videos at the same time. In particular, the advantages of the vertical TV are magnified more when the vertical TV is in association with a smartphone via a near-field communication (NFC)-based mirroring function. When watching regular TV programs or movies, the TV may be switched horizontally.

As another example, a rollable TV and a foldable smartphone are similar to each other in that they both use 'flexible displays'. The flexible display literally means a flexible electronic device. To be flexible, the flexible display must first be thin. A substrate that receives information and converts the same into light must be thin and flexible so that a performance lasts for a long time without damage.

Being flexible means that the flexible display should not be greatly affected even when an impact is applied thereto. While the flexible display is bent or folded, a pressure is continuously applied to a junction. It is necessary to have excellent durability such that the inside is not damaged by such pressure, but also have a property of being easily deformed when the pressure is applied.

The flexible display is implemented based on an organic light-emitting diode (OLED), for example. The OLED is a display using an organic light emitting material. The organic material is relatively more flexible than an inorganic material such as a metal. Furthermore, the OLED has a thin substrate and thus is more competitive than other displays. In a case of an LCD substrate used in the past, there is a limit to reducing a thickness because liquid crystal and glass are required separately.

There is an increasing demand for TVs capable of being easily moved indoors and outdoors as a new form factor for TVs. Especially, due to the recent COVID-19 pandemic, users are spending more time at home, and there is an increasing demand for second TVs. Furthermore, due to an increase in population engaging in outdoor activities such as camping, there is a demand for TVs with new form factors that are easy to carry and transport Such TVs with new form factors may allow display rotation as shown in FIG. 4. Thus, there is a need for control methods capable of better satisfying user experience when displaying contents according to display rotation.

SUMMARY

Accordingly, the present disclosure is directed to a portable display device and control method for the same that substantially obviates one or more problems due to limitations and disadvantages of the related art.

An object of the present disclosure is to provide a method of controlling images displayed on a display based on to the rotation state of the display.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a portable display device. The portable display device includes: a display; and a controller. The controller may be configured to: store a storage path of a first video and a storage path of a second video, wherein the first and second videos are related to at least two rotation states of the display; detect a change in a rotation state of the display during playback of the first video; store a video playback time at a moment at which the rotation state of the display changes; pause the playback of the first video that is currently playing; and control the second video to be played at a playback start time based on the storage path of the second video related to the detected rotation state, wherein the playback start time is determined based on the stored video playback time.

In another aspect of the present disclosure, there is provided a method of controlling a portable display device. The portable display device is configured to store a storage path of a first video and a storage path of a second video, wherein the first and second videos are related to at least two rotation states of a display. The method may include: detecting a change in a rotation state of the display during playback of the first video; storing a video playback time at a moment at which the rotation state of the display changes; pausing the playback of the first video that is currently playing; and controlling the second video to be played at a playback start time based on the storage path of the second video related to the detected rotation state, wherein the playback start time is determined based on the stored video playback time.

It will be understood by those skilled in the art that the above-described aspects of the present disclosure are merely part of various embodiments of the present disclosure, and various modifications and alternatives could be developed from the following technical features of the present disclosure.

The present disclosure has the following effects.

According to the present disclosure, even when a display is rotated, a display device may output high-quality images on a full screen with no degradation in image quality, thereby maximizing user experience while the display device is in use.

In addition, the display device may control a speaker to continuously output audio signals of images with no interruption even during the rotation of the display.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
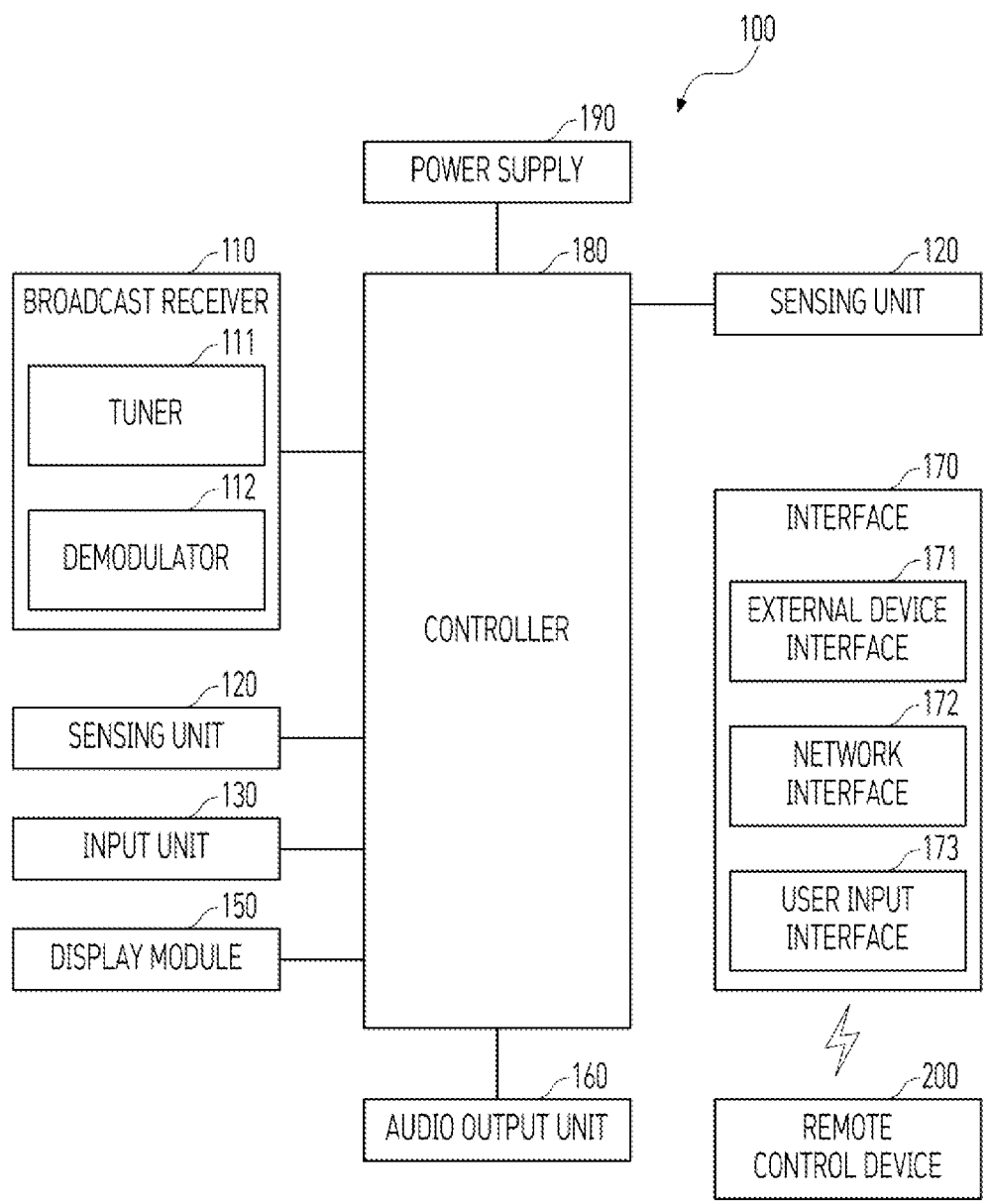
FIG. 1 is a block diagram for explaining each component of a display device.

Hereinafter, the embodiments disclosed herein will be described in detail with reference to the accompanying drawings, but components that are the same as or similar to each other regardless of reference numerals will be given the same reference numerals, and redundant description thereof will be omitted. The suffixes "module" and "unit" for components used in the following description are given or used together in consideration of ease of writing the present document, and do not have meanings or roles that are distinct from each other by themselves. Further, in describing the embodiments disclosed herein, when it is determined that a detailed description of related known technologies may unnecessarily obscure the gist of the embodiments disclosed herein, detailed description thereof will be omitted. In addition, the attached drawings are provided for easy understanding of the embodiments disclosed herein and do not limit technical idea disclosed herein, and should be construed as including all modifications, equivalents, and alternatives falling within the spirit and scope of the present disclosure.

Although terms including ordinal numbers, such as first, second, and the like, may be used to describe various components, the components are not limited by the terms. The terms are only used to distinguish one component from another.

It should be understood that when a component is referred to as being "connected with" another component, the component may be directly connected with another component or an intervening component may also be present. In contrast, it should be understood that when a component is referred to as being "directly connected with" another component, there is no intervening component present.

A singular representation may include a plural representation unless it represents a definitely different meaning from the context.

The terms "includes" or "has" used herein should be understood as not precluding possibility of existence or addition of one or more other characteristics, figures, steps, operations, constituents, components, or combinations thereof.

In the following descriptions, the term "display device" will be used. However, the term "display device" may refer to various devices such as TVs, multimedia devices, and so on, and thus, the scope of the present disclosure is not limited to specific terminology.

FIG. 1 is a block diagram for illustrating each component of a display device 100 according to an embodiment of the present disclosure.

The display device 100 may include a broadcast receiver 1210, an external device interface 171, a network interface 172, storage 140, a user input interface 173, an input unit 130, and a controller 180, a display module 150, an audio output unit 160, and/or a power supply 190.

The broadcast receiver 1210 may include a tuner 1211 and a demodulator 1212.

Unlike the drawing, the display device 100 may include only the external device interface 171 and the network interface 172 among the broadcast receiver 1210, the external device interface 171, and the network interface 172. That is, the display device 100 may not include the broadcast receiver 1210.

The tuner 1211 may select a broadcast signal corresponding to a channel selected by the user or all pre-stored channels among broadcast signals received via an antenna (not shown) or a cable (not shown). The tuner 1211 may convert the selected broadcast signal into an intermediate-frequency signal or a base band image or audio signal.

For example, when the selected broadcast signal is a digital broadcast signal, the tuner 1211 may convert the digital broadcast signal into a digital IF signal (DIF), and when the selected broadcast signal is an analog broadcast signal, the tuner 1211 may convert the analog broadcast signal into an analog base band image or audio signal (CVBS/SIF). That is, the tuner 1211 may process the digital broadcast signal or the analog broadcast signal. The analog base band image or audio signal (CVBS/SIF) output from the tuner 1211 may be directly input to the controller 180.

In one example, the tuner 1211 may sequentially select broadcast signals of all stored broadcast channels via a channel memory function among the received broadcast signals, and convert the selected signals into the intermediate-frequency signal or the base band image or audio signal.

In one example, the tuner 1211 may include a plurality of tuners to receive broadcast signals of a plurality of channels.

Alternatively, the tuner 1211 may be a single tuner that simultaneously receives the broadcast signals of the plurality of channels.

The demodulator 1212 may receive the digital IF signal (DIF) converted by the tuner 1211 and perform a demodulation operation. The demodulator 1212 may output a stream signal (TS) after performing demodulation and channel decoding. In this regard, the stream signal may be a signal in which an image signal, an audio signal, or a data signal is multiplexed.

The stream signal output from the demodulator 1212 may be input to the controller 180. The controller 180 may output an image via the display module 150 and output an audio via the audio output unit 160 after performing demultiplexing, image/audio signal processing, and the like.

A sensing unit 120 refers to a device that senses a change in the display device 100 or an external change. For example, the sensing unit 120 may include at least one of a proximity sensor, an illumination sensor, a touch sensor, an infrared (IR) sensor, an ultrasonic sensor, an optical sensor (e.g., a camera), a voice sensor (e.g., a microphone), a battery gauge, and an environment sensor (e.g., a hygrometer, a thermometer, and the like).

The controller 180 may check a state of the display device 100 based on information collected by the sensing unit 120, and when a problem occurs, the controller 180 may notify the user of the problem or may make adjustments on its own to control the display device 100 to maintain the best state.

In addition, a content, an image quality, a size, and the like of the image provided by the display module 150 may be controlled differently based on a viewer sensed by the sensing unit, a surrounding illumination, or the like to provide an optimal viewing environment. As a smart TV progresses, the number of functions of the display device increases and the number of sensing units 20 also increases together.

The input unit 130 may be disposed at one side of a main body of the display device 100. For example, the input unit 130 may include a touch pad, a physical button, and the like. The input unit 130 may receive various user commands related to an operation of the display device 100 and transmit a control signal corresponding to the input command to the controller 180.

Recently, as a size of a bezel of the display device 100 decreases, the number of display devices 100 in a form in which the input unit 130 in a form of a physical button exposed to the outside is minimized is increasing. Instead, the minimized physical button may be located on a rear surface or a side surface of the display device 100, and a user input may be received from a remote control device 200 via the touch pad or the user input interface 173 to be described later.

The storage 140 may store programs for processing and controlling each signal in the controller 180, or may store signal-processed image, audio, or data signals. For example, the storage 140 may store application programs designed for the purpose of performing various tasks processable by the controller 180, and may selectively provide some of the stored application programs upon request from the controller 180.

The programs stored in the storage 140 are not particularly limited as long as they may be executed by the controller 180. The storage 140 may also perform a function for temporarily storing the image, audio, or data signals received from an external device via the external device interface 171. The storage 140 may store information on a predetermined broadcast channel via the channel memory function such as a channel map.

FIG. 1 shows an embodiment in which the storage 140 is disposed separately from the controller 180, but the scope of the present disclosure is not limited thereto, and the storage 140 is able to be included in the controller 180.

The storage 140 may include at least one of a volatile memory (e.g., a DRAM, a SRAM, a SDRAM, and the like) or a non-volatile memory (e.g., a flash memory, a hard disk drive (HDD), a solid-state drive (SSD), and the like).

The display module 150 may generate a driving signal by converting the image signal, the data signal, an OSD signal, and a control signal processed by the controller 180 or the image signal, the data signal, a control signal, and the like received from the interface 171. The display module 150 may include the display panel 11 having the plurality of pixels.

The plurality of pixels disposed on the display panel may include RGB sub-pixels. Alternatively, the plurality of pixels disposed on the display panel may include RGBW sub-pixels. The display module 150 may generate driving signals for the plurality of pixels by converting the image signal, the data signal, the OSD signal, the control signal, and the like processed by the controller 180.

The display module 150 may be a plasma display panel (PDP), a liquid crystal display (LCD), an organic light emitting diode (OLED), a flexible display module, and the like, or may be a three-dimensional (3D) display module. The 3D display module 150 may be classified into a non-glasses type and a glasses type.

The display device 100 includes the display module that occupies most of the front surface thereof and a casing that covers a rear surface, a side surface, and the like of the display module and packages the display module.

Recently, the display device 100 may use the display module 150 that may be bent such as the light emitting diode (LED) or the organic light emitting diode (OLED) to realize a curved screen in addition to a flat screen.

The LCD, which was mainly used in the past, received light via a backlight unit because it was difficult for the LCD to emit light on its own. The backlight unit is a device that uniformly supplies light supplied from a light source to a liquid crystal located in the front. As the backlight unit became thinner, it was possible to realize a thin LCD, but it was difficult to implement the backlight unit with a flexible material, and when the backlight unit is bent, it was difficult to uniformly supply the light to the liquid crystal, resulting in a change in brightness of the screen.

On the other hand, the LED or the OLED may be implemented to be bendable because each element constituting the pixel emits light on its own and thus the backlight unit is not used. In addition, because each element emits light on its own, even when a positional relationship with a neighboring element changes, brightness thereof is not affected, so that the display module 150 that is bendable using the LED or the OLED may be implemented.

The organic light emitting diode (OLED) panel appeared in earnest in mid-2010 and is rapidly replacing the LCD in a small and medium-sized display market. The OLED is a display made using a self-luminous phenomenon of emitting light when current flows through a fluorescent organic compound. The OLED has a higher image quality response speed than the LCD, so that there is almost no afterimage when realizing a moving image.

The OLED is a light-emitting display product that uses three types (red, green, and blue) of phosphor organic compounds having a self-luminous function, and uses a phenomenon in which electrons and positively charged particles injected from a cathode and an anode are combined with each other within an organic material to emit light by itself, so that there is no need for a backlight (a backlight device) that deteriorates color.

The light emitting diode (LED) panel, as a technology that uses one LED element as one pixel, may reduce a size of the LED element compared to the prior art, and thus, may implement the display module 150 that is bendable. A device referred to as an LED TV in the past only used the LED as the light source for the backlight unit that supplies the light to the LCD, and the LED itself was not able to constitute the screen.

The display module includes the display panel, and a coupling magnet, a first power supply, and a first signal module positioned on a rear surface of the display panel. The display panel may include a plurality of pixels R, G, and B. The plurality of pixels R, G, and B may be formed in respective areas where multiple data lines and multiple gate lines intersect each other. The plurality of pixels R, G, and B may be disposed or arranged in a matrix form.

For example, the plurality of pixels R, G, and B may include a red (hereinafter, 'R') sub-pixel, a green ('G') sub-pixel, and a blue ('B') sub-pixel. The plurality of pixels R, G, and B may further include a white (hereinafter, 'W') sub-pixel.

In the display module 150, a side on which the image is displayed may be referred to as a front side or a front surface. When the display module 150 displays the image, a side on which the image is not able to be observed may be referred to as a rear side or a rear surface.

In one example, the display module 150 may be constructed as the touch screen and may be used as the input device in addition to the output device.

The audio output unit 160 receives an audio-processed signal from the controller 180 and outputs the received signal as the audio.

An interface 170 serves as a passage for various types of external devices connected to the display device 100. The interface may be in a wireless scheme using the antenna as well as a wired scheme of transmitting and receiving data via the cable.

The interface 170 may include at least one of a wired/wireless headset port, an external charger port, a wired/wireless data port, a memory card port, a port for connecting a device having an identification module, an audio input/output (I/O) port, a video input/output (I/O) port, and an earphone port.

An example of the wireless scheme may include the broadcast receiver 1210 described above, and may include not only the broadcast signal, but also a mobile communication signal, a short-distance communication signal, a wireless Internet signal, and the like.

The external device interface 171 may transmit or receive data with a connected external device. To this end, the external device interface 171 may include an A/V input/output unit (not shown).

The external device interface 171 may be connected to the external device such as a digital versatile disk (DVD), a Blu-ray, a game console, a camera, a camcorder, a computer (a laptop), a set-top box, and the like in a wired/wireless manner, and may perform input/output operations with the external device.

In addition, the external device interface 171 may establish a communication network with various remote control devices 200 to receive a control signal related to the operation of the display device 100 from the remote control device 200 or to transmit data related to the operation of the display device 100 to the remote control device 200.

The external device interface 171 may include a wireless communication unit (not shown) for short-range wireless communication with other electronic devices. With such a wireless communication unit (not shown), the external device interface 171 may exchange data with an adjacent mobile terminal. In particular, the external device interface 171 may receive device information, running application information, an application image, and the like from the mobile terminal in a mirroring mode.

The network interface 172 may provide an interface for connecting the display device 100 to a wired/wireless network including an Internet network. For example, the network interface 172 may receive content or data provided by the Internet, a content provider, or a network operator via the network. In one example, the network interface 172 may include a communication module (not shown) for connection to the wired/wireless network.

The external device interface 171 and/or the network interface 172 may include a communication module for the short-range communication such as a wireless fidelity (Wi-Fi), a Bluetooth, a Bluetooth low energy (BLE), a Zigbee, and a near field communication (NFC), a communication module for cellular communication such as a long-term evolution (LTE), an LTE advance (LTE-A), a code division multiple access (CDMA), a wideband CDMA (WCDMA), a universal mobile telecommunications system (UMTS), and a wireless broadband (WiBro), and the like.

The user input interface 173 may transmit a signal input by the user to the controller 180 or transmit a signal from the controller 180 to the user. For example, a user input signal such as power ON/OFF, channel selection, screen setting, and the like may be transmitted/received to/from the remote control device 200, a user input signal input from a local key (not shown) such as a power key, a channel key, a volume key, a setting value, and the like may be transmitted to the controller 180, a user input signal input from a sensor unit (not shown) that senses a gesture of the user may be transmitted to the controller 180, or a signal from the controller 180 may be transmitted to the sensor unit.

The controller 180 may include at least one processor, and may control overall operations of the display device 100 using the processor included therein. In this regard, the processor may be a general processor such as a central processing unit (CPU). In one example, the processor may be a dedicated device such as an ASIC or a processor based on other hardware.

The controller 180 may demultiplex the stream input via the tuner 1211, the demodulator 1212, the external device interface 171, or the network interface 172, or process a demultiplexed signal to generate or output a signal for image or audio output.

The image signal image-processed by the controller 180 may be input to the display module 150 and displayed as an image corresponding to the corresponding image signal. In addition, the image signal image-processed by the controller 180 may be input to an external output device via the external device interface 171.

The audio signal processed by the controller 180 may be output as the audio via the audio output unit 160. In addition, the audio signal processed by the controller 180 may be input to the external output device via the external device interface 171. In addition, the controller 180 may include a demultiplexer, an image processor, and the like.

In addition, the controller 180 may control overall operations within the display device 100. For example, the controller 180 may control the tuner 1211 to select (tune) a broadcast corresponding to the channel selected by the user or the pre-stored channel.

In addition, the controller 180 may control the display device 100 in response to a user command input via the user input interface 173 or by an internal program. In one example, the controller 180 may control the display module 150 to display the image. In this regard, the image displayed on the display module 150 may be a still image or a moving image, and may be a 2D image or a 3D image.

In one example, the controller 180 may allow a predetermined 2D object to be displayed within the image displayed on the display module 150. For example, the object may be at least one of a connected web screen (a newspaper, a magazine, and the like), an electronic program guide (EPG), various menus, a widget, an icon, the still image, the moving image, and a text.

In one example, the controller 180 may modulate and/or demodulate a signal using an amplitude shift keying (ASK) scheme. Here, the amplitude shift keying (ASK) scheme may refer to a scheme of modulating the signal by varying an amplitude of a carrier wave based on a data value or restoring an analog signal to a digital data value based on to the amplitude of the carrier wave.

For example, the controller 180 may modulate the image signal using the amplitude shift keying (ASK) scheme and transmit the modulated image signal via a wireless communication module.

For example, the controller 180 may demodulate and process the image signal received via the wireless communication module using the amplitude shift keying (ASK) scheme.

Therefore, the display device 100 may easily transmit and receive a signal with another image display device disposed adjacent thereto without using a unique identifier such as a media access control address (MAC address) or a complex communication protocol such as TCP/IP.

In one example, the display device 100 may further include a photographing unit (not shown). The photographing unit may photograph the user. The photographing unit may be implemented with one camera, but may not be limited thereto, and may be implemented with a plurality of cameras. In one example, the photographing unit may be embedded in the display device 100 or disposed separately upwardly of the display module 150. Information on the image photographed by the photographing unit may be input to the controller 180.

The controller 180 may recognize a location of the user based on the image photographed by the photographing unit. For example, the controller 180 may identify a distance between the user and the display device 100 (a z-axis coordinate). In addition, the controller 180 may determine an x-axis coordinate and a y-axis coordinate within the display module 150 corresponding to the location of the user.

The controller 180 may sense the gesture of the user based on the image photographed by the photographing unit or the signal sensed by the sensor unit, or a combination thereof.

The power supply 190 may supply the corresponding power throughout the display device 100. In particular, the power may be supplied to the controller 180 that may be implemented in a form of a system on chip (SOC), the display module 150 for displaying the image, the audio output unit 160 for outputting the audio, and the like.

Specifically, the power supply 190 may include a converter (not shown) that converts AC power to DC power and a Dc/Dc converter (not shown) that converts a level of the DC power.

In one example, the power supply 190 serves to receive the power from the outside and distribute the power to each component. The power supply 190 may use a scheme of supplying the AC power in direct connection to an external power source, and may include a power supply 190 that may be charged and used by including a battery.

In a case of the former, the power supply is used in connection with the cable, and has difficulties in moving or is limited in a movement range. In a case of the latter, the movement is free, but a weight and a volume of the power supply increase as much as those of the battery, and the power supply must be directly connected to a power cable for a certain period of time for charging or coupled to a charging cradle (not shown) that supplies the power.

The charging cradle may be connected to the display device via a terminal exposed to the outside, or the built-in battery may be charged using a wireless scheme when approaching the charging cradle.

The remote control device 200 may transmit the user input to the user input interface 173. To this end, the remote control device 200 may use the Bluetooth, a radio frequency (RF) communication, an infrared radiation (IR) communication, an ultra-wideband (UWB), the ZigBee, or the like. In addition, the remote control device 200 may receive the image, audio, or data signal output from the user input interface 173 and display the same thereon or output the same as audio.

In one example, the display device 100 described above may be a fixed or mobile digital broadcast receiver that may receive a digital broadcast.

The block diagram of the display device 100 shown in FIG. 1 is only a block diagram for one embodiment of the present disclosure, and each component of the block diagram is able to be integrated, added, or omitted based on specifications of the display device 100 that is actually implemented.

That is, when necessary, two or more components may be combined to each other into one component, or one component may be subdivided into two or more components. In addition, functions performed in each block are for illustrating the embodiment of the present disclosure, and a specific operation or a device thereof does not limit the scope of rights of the present disclosure.

Figure 2:
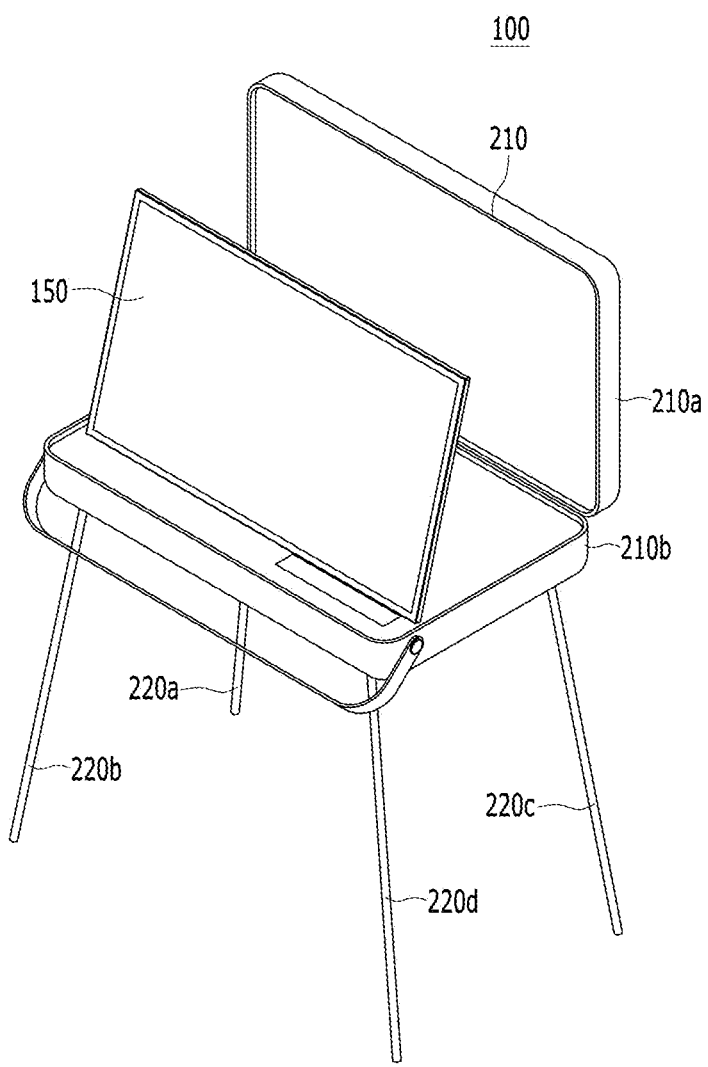
FIG. 2 is a diagram illustrating a display device according to an embodiment of the present disclosure.

FIG. 2 is a diagram showing a display device according to an embodiment of the present disclosure. Hereinafter, redundant descriptions duplicate with the above descriptions will be omitted.

Referring to FIG. 2, the display device 100 has the display module 150 accommodated inside a housing 210. In this regard, the housing 210 may include an upper casing 210a and a lower casing 210b, and the upper casing 210a and the lower casing 210b may have a structure of being opened and closed.

In one embodiment, the audio output unit 160 may be included in the upper casing 210a of the display device 100, and the main board that is the controller 180, a power board, the power supply 190, the battery, the interface 170, the sensing unit 120, and the input unit (including the local key) 130 may be accommodated in the lower casing 210b. In this regard, the interface 170 may include a Wi-Fi module, a Bluetooth module, an NFC module, and the like for the communication with the external device, and the sensing unit 120 may include an illuminance sensor and an IR sensor.

In one embodiment, the display module 150 may include a DC-DC board, a sensor, and a low voltage differential signaling (LVDS) conversion board.

In addition, in one embodiment, the display device 100 may further include four detachable legs 220a, 220b, 220c, and 220d. In this regard, the four legs 220a, 220b, 220c, and 220d may be attached to the lower casing 210b to space the display device 100 from the floor.

Figure 3:
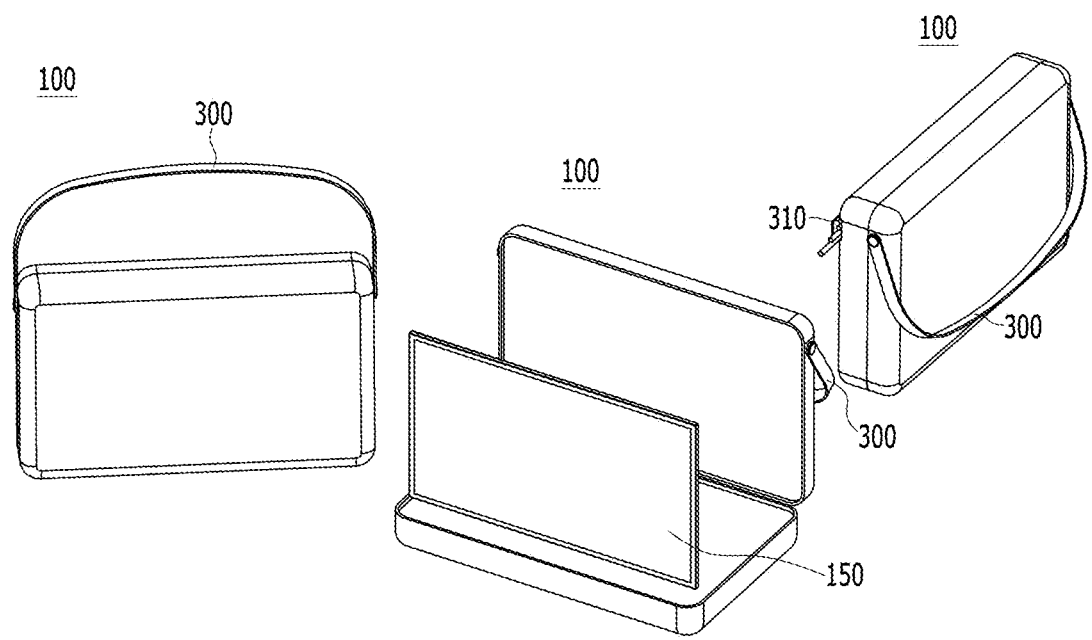
FIG. 3 is a diagram illustrating an example of using a display device according to an embodiment of the present disclosure.

FIG. 3 is a diagram showing an example of utilization of a display device according to an embodiment of the present disclosure. Hereinafter, redundant descriptions duplicate with the above descriptions will be omitted.

In the embodiment of FIG. 3, the display device 100 represents an example of utilization that does not include the legs. Referring to FIG. 3, the display device 100 has the structure in which the display module is mounted in the upper casing and the lower casing as described above, and is able to be changed into a structure that may be carried like a bag when the upper casing and the lower casing are closed.

In one embodiment, the display device 100 may include a handle 300 on the upper casing or the lower casing. In this regard, the handle 300 may have a structure attached to left and right side surfaces of the upper casing or the lower casing such that the user may lift the housing with the closed upper casing and lower casing. In this regard, the handle 300 may be made of a material that is easy for the user to hold in the hand, such as leather or plastic.

That is, the display device 100 includes the handle 300 with the upper casing or the lower casing closed, so that the user may easily carry and move the display device 100.

In addition, when necessary, the user may use the mounted display module 150 by placing the lower casing on the floor and opening the upper casing. This will be described in detail with reference to FIGS. 4 and 5.

In addition, in one embodiment, the display device 100 may further include an accommodating space 310 at the side surface of the lower casing. In this regard, the accommodating space 310 may include the various modules described above in FIG. 1. In addition, the accommodating space 310 may include a space for accommodating a touch-pen, a wireless earphone, or the like.

Figure 4:
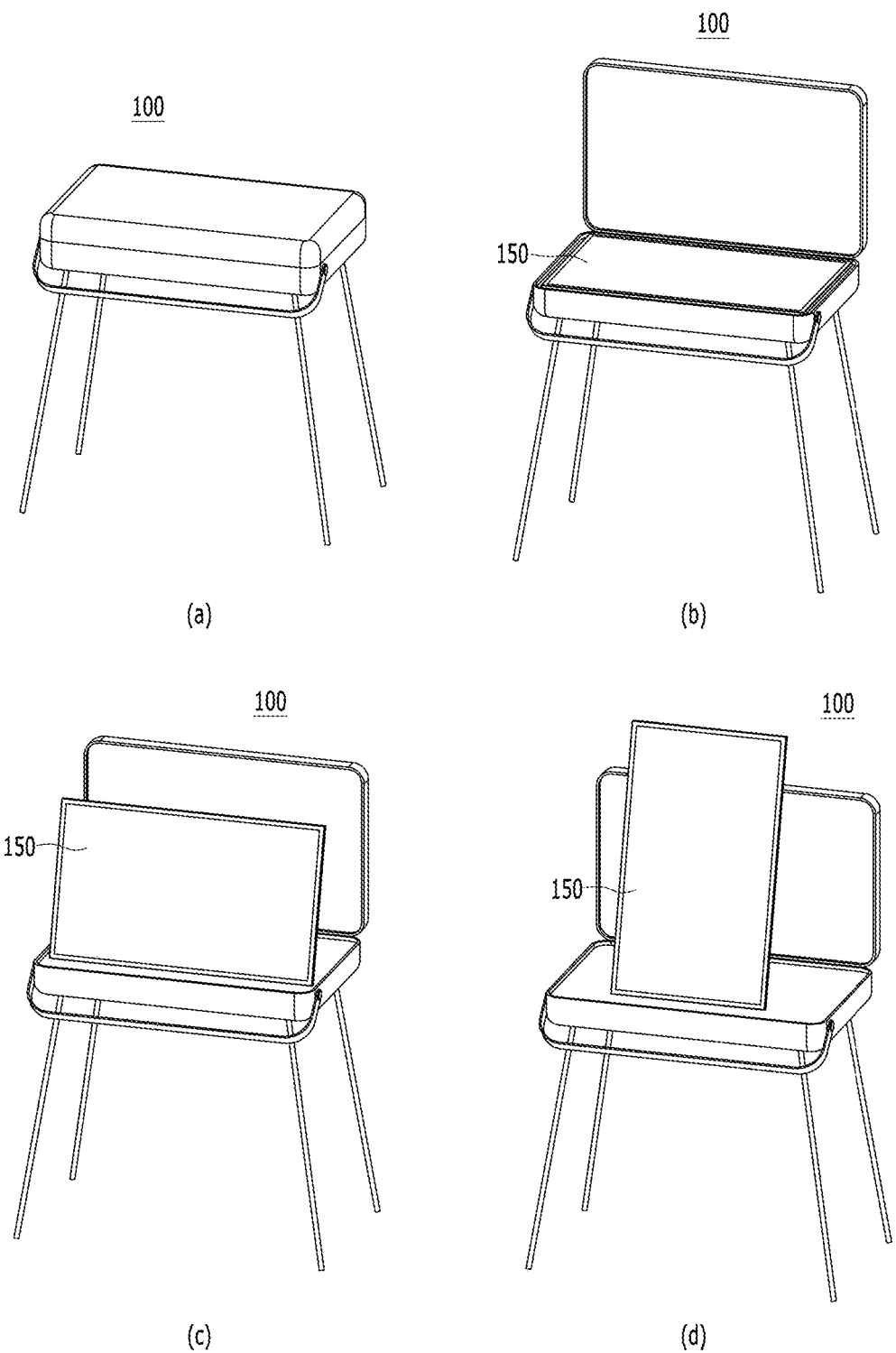
FIG. 4 is a diagram illustrating another example of using a display device according to an embodiment of the present disclosure.

FIG. 4 is another diagram showing an example of utilization of a display device according to an embodiment of the present disclosure. Hereinafter, redundant descriptions duplicate with the above descriptions will be omitted.

In one embodiment of the present disclosure, the display device 100 may include four legs. In this regard, the four legs are attached to the lower casing to space the display device 100 from the floor.

Accordingly, the user may not only use the display device 100 while moving the same, but also use the same at a fixed location away from the floor.

(a) to (d) in FIG. 4 show an example of utilization in which the legs of the display device 100 are attached and the display device 100 is used at the fixed location. In this regard, (a) in FIG. 4 shows a state in which the upper casing of the display device 100 is closed, and (b) to (d) in FIG. 4 show a state in which the upper casing is opened.

Specifically, (b) in FIG. 4 shows a state in which the display module 150 is accommodated in the lower casing with the upper casing open. In other words, (b) in FIG. 4 shows a state in which the display module 150 lies inside the lower casing with the upper casing open. Even in the state in which the display module 150 is accommodated in the lower casing, the display module 150 may be activated.

In one embodiment, the display device 100 may provide an edit mode while the display module 150 is accommodated in the lower casing. In this regard, the edit mode may include a function of adding at least one of a memo function, a drawing function, and a voice recording function to a content.

That is, when the display module 150 is mounted on the lower casing, the display device 100 may determine that the user intends to appreciate/watch the content via the display module 150.

On the other hand, when the display module 150 is accommodated in the lower casing, the display device 100 may determine that the user intends to edit the content output on the display module 150. Accordingly, the display device 100 may provide a function of editing the content when the display module 150 is accommodated in the lower casing.

(c) in FIG. 4 shows a state in which the display module 150 is horizontally mounted on the lower casing with the upper casing open, and (d) in FIG. 4 shows a state in which the display module 150 is vertically mounted on the lower casing with the upper casing open. In this regard, (c) and (d) in FIG. 4 show a state in which the display module 150 is erected using the lower casing as a foothold.

In addition, in one embodiment, the display device 100 may automatically accommodate or mount the display module 150 in or on the lower casing using a motor (not shown).

More specifically, when the upper casing of the display device 100 is opened, the display module 150 may be automatically mounted horizontally or vertically on the lower casing.

In addition, in another embodiment, when the upper casing of the display device 100 is opened, the display module 150 may be primarily accommodated on the lower casing. Thereafter, the display device 100 may mount the display module 150 on the lower casing in response to a signal of touching the display module 150 and a signal input from the sensing unit or the input unit. For example, the user may mount the display module 150 on the lower casing by pressing the display module 150 accommodated inside the lower casing downwardly. This will be described in detail with reference to FIG. 5.

Figure 5:
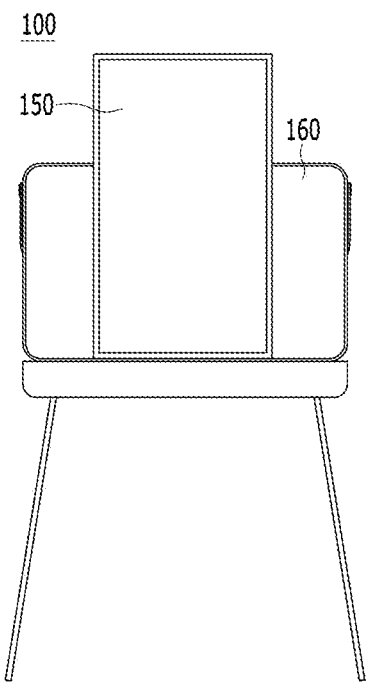
FIG. 5 is a diagram illustrating front and side surfaces of a display device according to an embodiment of the present disclosure.
Figure 5:
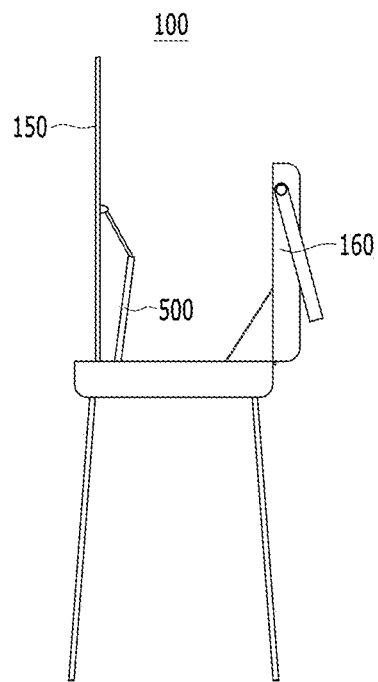
Figure 5:
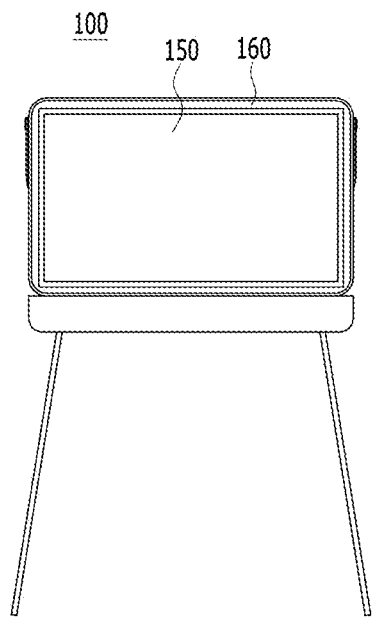
Figure 5:
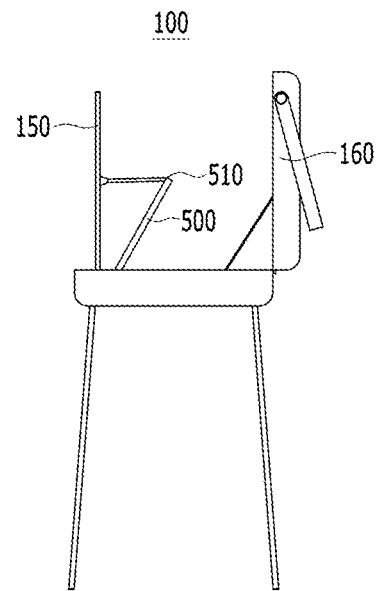

FIG. 5 is a diagram showing front and side surfaces of a display device according to an embodiment of the present disclosure. Hereinafter, redundant descriptions duplicate with the above descriptions will be omitted.

(a) and (b) in FIG. 5 show a state in which the display module 150 is mounted vertically, and (c) and (d) in FIG. 5 show a state in which the display module 150 is mounted horizontally.

(a) and (c) in FIG. 5 are views showing the display device 100 from the front, and (b) and (d) in FIG. 5 are views showing the display device 100 from the side.

In one embodiment, because the upper casing may include the audio output unit 160, in (a) in FIG. 5, the display module 150 may be mounted vertically and there may be the upper casing including the audio output unit 160 at the rear of the display module 150.

Referring to (b) in FIG. 5, the display device 100 may further include a support member 500 to vertically mount the display module 150 on the lower casing. That is, when the display device 100 is viewed from the side as shown in (b) in FIG. 5, the support member 500 may be included in the lower casing and may be designed in a foldable structure to vertically mount the display module 150. In this regard, the support member 500 may be controlled by the motor of the display device 100 and may be operated manually by the user's hand.

Referring to (c) in FIG. 5, the display device 100 may have the display module 150 mounted thereon horizontally and the audio output unit 160 at the rear of the display module 150.

Referring to (d) in FIG. 5, the display device 100 may include the support member 500 to horizontally mount the display module 150 on the lower casing. In this regard, the support member 500 may be the same as the support member 500 in (b) in FIG. 5, but may be in a state in which a hinge 510 included in the support member 500 is folded more to horizontally mount the display module 150.

In addition, in one embodiment, the display module 150 may be manually mounted horizontally or vertically by the user's hand. In another embodiment, the display module 150 may be mounted horizontally or vertically on the lower casing in response to the control of the display device 100. In this regard, the display device 100 may mount the display module 150 horizontally or vertically based on the control signal of the user (sensed via the sensing unit or the input unit).

Figure 6:
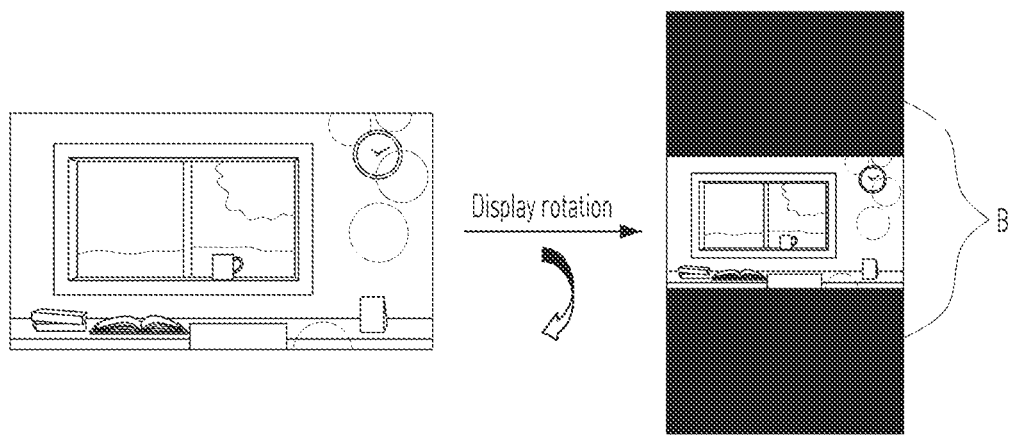
FIG. 6 illustrates images displayed based on display rotation of a display device.

FIG. 6 illustrates images displayed based on display rotation of the display device 100. The display module 150 (hereinafter referred to as "display") of the display device 100 is rotatable. The display 150 may display an image or play a video in both a landscape mode (left side of FIG. 6) and a portrait mode (right side of FIG. 6) as described above.

In the prior art, when a display rotates while displaying an image or playing a video as shown in FIG. 6, mode transition (landscape to portrait or portrait to landscape) events may be detected by a rotation sensor. In this case, a display device typically rotates the image or video to match the resolution of the display. As a result, as shown in B of FIG. 6, areas outside the image or video display are processed in black. The black areas may provide frustrating content to users and have a negative impact on user experience.

FIG. 6 illustrates a case where a horizontal video is displayed or played in the landscape mode and then displayed or played in the portrait mode. However, this issue also occurs when a vertical video is displayed or played in the portrait mode and then displayed or played in the landscape mode. In this case, unlike B of FIG. 6, the video is displayed or played in the center of the display, and the left and right sides of the area where the video is displayed are processed in black.

Figure 7:
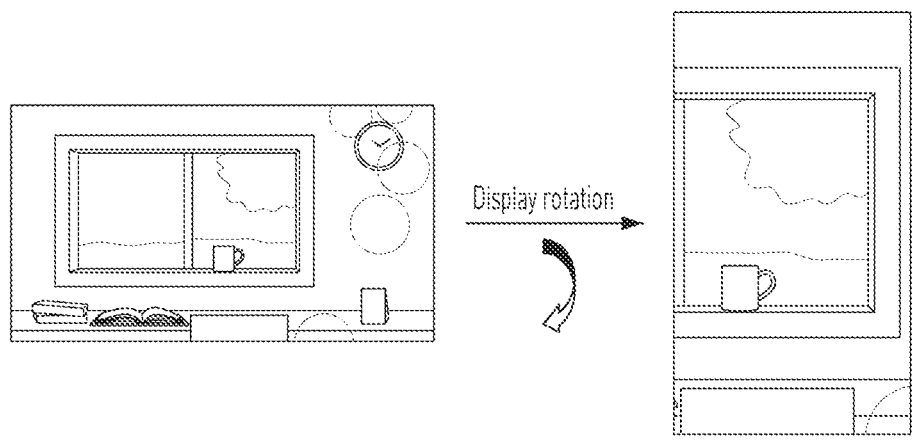
FIG. 7 illustrates images displayed based on display rotation of a display device according to the proposed technology.

FIG. 7 illustrates images displayed based on display rotation of the display device 100 according to the proposed technology.

According to the proposed technology, images may be displayed or played on the entirety of the display even when the display rotates.

To this end, the proposed technology may provide a horizontal image (i.e., first image) and a vertical image (i.e., second image) for a single piece of content.

The horizontal image refers to an image with a resolution optimized for the landscape mode of the display, and the vertical image refers to an image with a resolution optimized for the portrait mode of the display. If the resolution of the display is 1920*1080 in the landscape mode, the horizontal image may be provided to have the same resolution. If the resolution of the display is 1080*1920 in the portrait mode, the vertical image may be provided to have the same resolution.

Ideally, the horizontal and vertical images need to provide a sense of consistency for better user experience, and thus, the horizontal and vertical images need to be obtained from the same subject (object, environment, etc.). In addition, the horizontal and vertical images need to be temporally synchronized to ensure seamless image playback even when the display rotates, and it is also desirable for the horizontal and vertical images to have the same playback duration. Moreover, the horizontal and vertical images share the same audio signal. Therefore, the audio output unit may output the same audio signal, regardless of whether the horizontal or vertical image is played.

The vertical image may be acquired from the horizontal image, and conversely, the horizontal image may also be obtained from the vertical image. The vertical image may be obtained by transforming a portion of the horizontal image. That is, image processing such as cropping, scaling, and interpolation may be applied to match the resolution of the vertical image. The same method may also be applied to obtain the horizontal image from the vertical image.

However, it should be noted that the present disclosure is not limited to specific methods for obtaining horizontal or vertical images.

The images shown in FIGS. 6 and 7 are examples of content capable of being provided by the display device 100, which serves as a means to offer content that provides user experience similar to the trendy activity of going camping and quietly gazing at the sight and sound of burning firewood, which is called 'fire-staring' in Korean. The content provided by the display device 100 may be extended to a variety of images (including audio) with different themes, not limited to just 'fire-staring'. According to the proposed technology, the display device 100 may provide images created with various themes, i.e., various image themes by outputting the various image themes to the display and the audio output unit. In this document, the term "image" is simply used, but the term "image" encompasses audio signals and refers to various image themes for content that provides user experience as described above.

Figure 8:
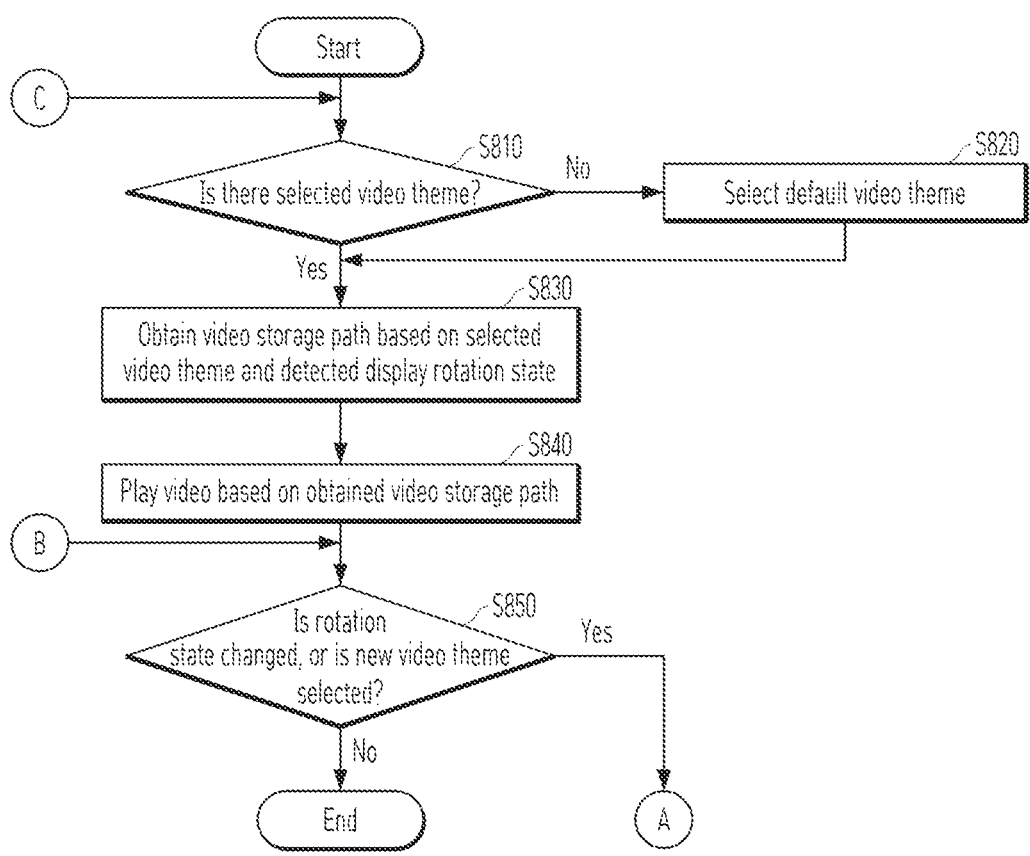
FIGS. 8 and 9 are flowcharts illustrating a method to which the proposed technology is applied.
Figure 9:
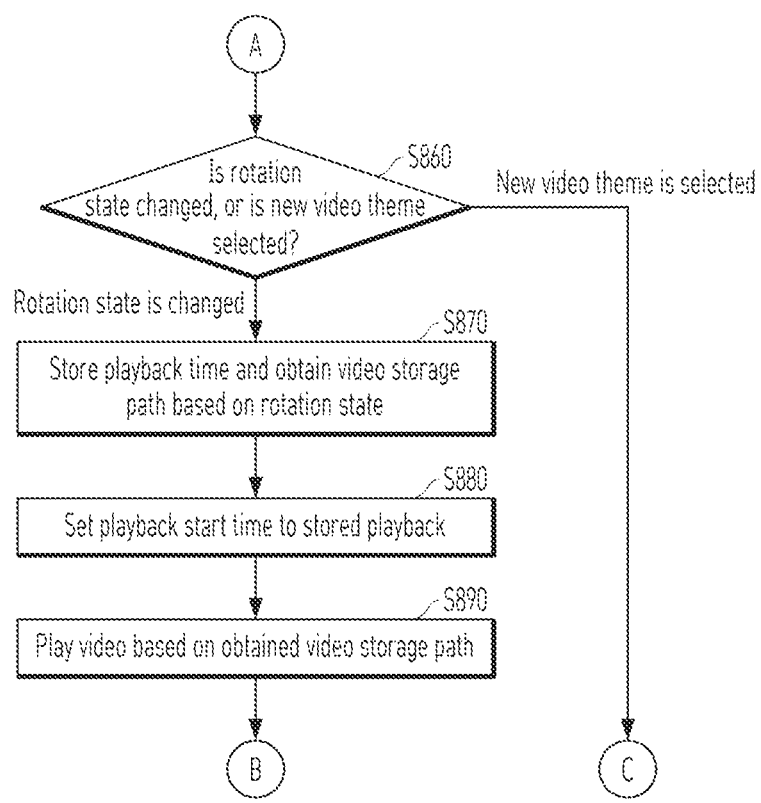

FIGS. 8 and 9 are flowcharts illustrating a method to which the proposed technology is applied. The method shown in FIGS. 8 and 9 may be initiated based on execution of a user interface (e.g., application) designed for providing the above-described image themes. The method may be performed by the portable display device 100, and more particularly, the method may be performed by the controller 180. However, it should be noted that an entity performing the method of FIGS. 8 and 9 is the portable display device 100 or components thereof, and the scope of the rights of the present disclosure is not limited by the names of these components. Hereinafter, it is assumed that the method is performed by a control device.

The control device may determine whether there is a selected image theme (S810). The control device may display multiple image themes on the display and receive a selection input from the user through the user input interface 173. Optionally, if there is no selected image theme, the control device may select a predetermined default image theme (S820).

The control device may obtain an image storage path based on the selected image theme and the detected rotation state of the display (S830). To this end, the control device may obtain information on the rotation state (e.g., landscape mode or portrait mode) of the display. An image may be provided based on each rotation state of the display, and a storage path may be preconfigured for each image. If the display is detected to be in the landscape mode, the control device may obtain an image storage path for the landscape mode. If the display is detected to be in the portrait mode, the control device may obtain an image storage path for the portrait mode.

The control device may play the corresponding image based on the obtained image storage path (S840).

While playing the image, the control device may monitor whether the rotation state of the display changes or whether a new image theme is selected (S850).

If there is no change in the rotation state of the display or if there is no selected new image theme, the method may be terminated. Alternatively, even if there is no change in the rotation state of the display or if there is no selected new image theme, the control device may continue playing the image only for a preconfigured period of time and then turn off the display (for example, the control device may enter a power-saving mode).

Upon detecting that the new image theme is selected, the control device may return to step S810 and perform the procedure shown in FIG. 8.

Upon detecting that the rotation state of the display changes, the control device may store the playback time of the currently playing image and obtain an image storage path based on the detected rotation state (S870).

The playback time refers to a point of the image displayed on the display, which may be expressed, for example, as 'aa hours bb minutes cc seconds.'

When it is detected that the rotation state of the display transitions from the landscape mode to the portrait mode, the control device may obtain the image storage path for the portrait mode.

The control device may set the playback start time of the image, which is based on the detected rotation state, to the stored playback time of the image (S880). This operation is for continuous image playback (i.e., seamless viewing) even after image replacement. In other words, the operation aims to give viewers the perception that the same image is being played despite the rotation of the display.

The control device may play the corresponding image at the playback start time based on the obtained image storage path (S890). When it is detected that the display switches from the landscape mode to the portrait mode, the control device may play the image in the portrait mode at the playback start time.

Thereafter, the control device may return to S850. That is, while playing the image, the control device may monitor whether the rotation state of the display changes or whether a new image theme is selected.

Figure 10:
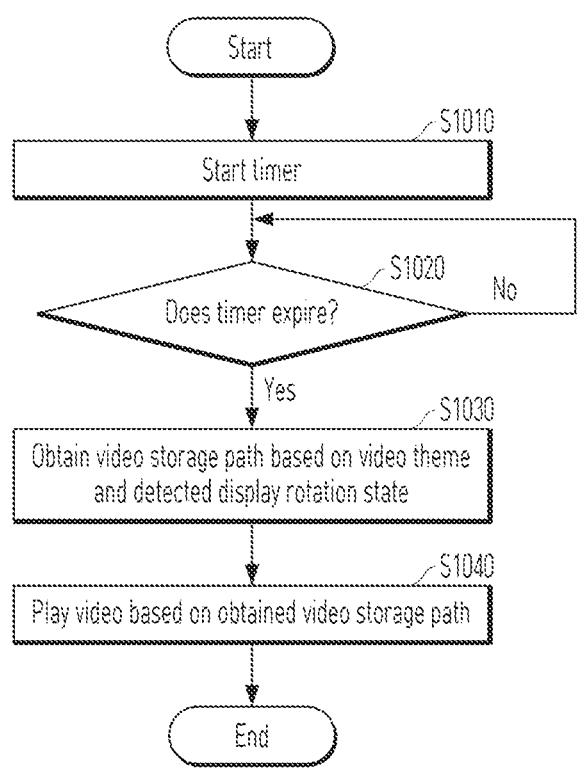
FIG. 10 is a flowchart illustrating an extended example of the method to which the proposed technology is applied.

FIG. 10 is a flowchart illustrating an extended example of the method to which the proposed technology is applied.

FIG. 10 shows a case where the user interface (e.g., application) designed for providing the image themes described above is not launched by user inputs.

The control device may start a timer when reception of user inputs through the user input interface 173 is completed (S1010). The timer may have a preconfigured duration (e.g., 30 seconds).

The control device may determine whether the timer expires (S1020).

If the timer expires, the control device may obtain an image storage path based on the image theme and the detected rotation state of the display (S1030).

The control device may play the image based on the obtained image storage path (S1040).

The control device may continue playing the image only for the preconfigured period of time and then turn off the display (for example, the control device may enter the power-saving mode).

Figure 11:
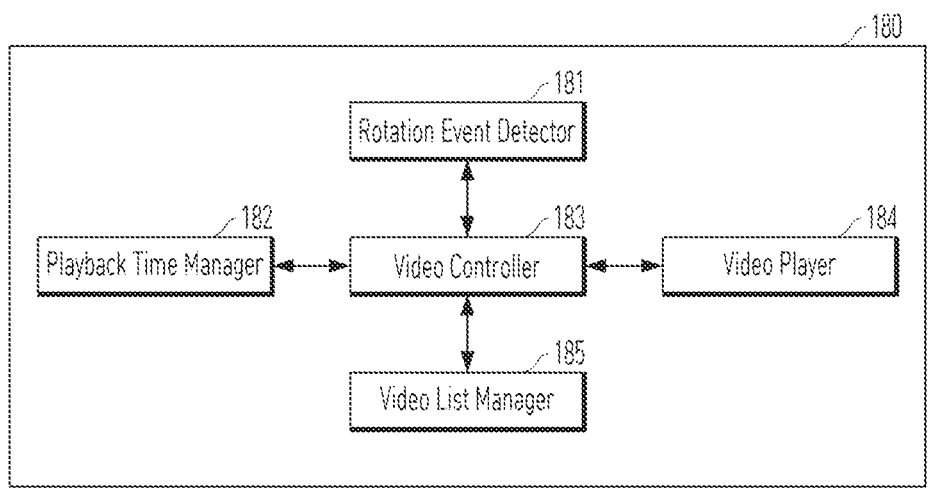
FIG. 11 is a block diagram illustrating a device for the proposed technology.

FIG. 11 is a block diagram illustrating a device for the proposed technology.

The controller 180 of the portable display device 100 may include a rotation event detector 181, a playback time manager 182, a video controller 183, a video player 184, and a video list manager 185.

The rotation event detector 181 may detect the rotation or rotation state of the display sensed by the sensing unit 120 including a gyroscope sensor. When it is detected that the rotation state of the display changes, the rotation event detector 181 may inform the playback time manager 182 that the rotation state of the display changes.

The playback time manager 182 may store the playback time of the currently playing image at a moment when it is detected that the rotation state of the display changes. Additionally, the playback time manager 182 may determine the playback start time of the image based on the stored playback time.

The video controller 183 may control the initiation or termination of the playback or display of the image. The video controller 183 may transmit information on the playback start time and/or storage path of the image to be played to the video player 184. The video player 184 may play or pause the image under the control of the video controller 183. In other words, the video player 184 may play a second image at the received playback start time based on the storage path of the second image related to the detected rotation state.

The video list manager 185 stores information on a plurality of images related to the rotation states of the display. The information on the plurality of images includes the storage path for each image, which indicates a location where each image is stored within the storage 140 of the display device 100.

According to the proposed technology, since the display device 100 plays at least two images by transitioning therebetween based on the rotation of the display, the display device 100 requires time for the transition. In other words, if the rotation of the display is detected during the playback of a first image, a time gap (i.e., image transition period) may be required to stop the playback of the first image and then start the playback of the second image (i.e., to transition from the first image to the second image). Accordingly, the playback start time of the second image may be determined by adding the length of the image transition period to the stored playback time of the image.

The image transition period may start when the display rotate by a predetermined first angle or more. In other words, when the rotation angle of the display is greater than or equal to the first angle, the video controller 183 may pause the playback of the first image.

The image transition period may end when the display is rotated by a predetermined second angle or more. In other words, when the rotation angle of the display is greater than or equal to the second angle, the video controller 183 may start the playback of the second image.

FIG. 11 shows that the controller 180 includes the rotation event detector 181, playback time manager 182, video controller 183, video player 184, and video list manager 185, and the present disclosure is carried out by each component. However, the rotation event detector 181, playback time manager 182, video controller 183, video player 184, and video list manager 185 may be integrated into the controller 180, and the functions or operations thereof may be performed by the controller 180.

In another aspect of the present disclosure, the above-described proposals or operations may be provided as code that is capable of being implemented, performed, or executed by computers (herein, the computer is a comprehensive concept including a system on chip (SoC), a processor, a microprocessor etc.) or a computer-readable storage medium or computer program product storing or including the code. The scope of the present disclosure may be extended to the code or the computer-readable storage medium or computer program product storing or including the code.

The preferred embodiments of the present disclosure are provided to allow those skilled in the art to implement and embody the present disclosure. While the present disclosure has been described and illustrated herein with reference to the preferred embodiments thereof, it is understood to those skilled in the art that various modifications and variations could be made therein without departing from the scope of the disclosure. Therefore, the present disclosure is not limited to the embodiments disclosed herein but intends to give the broadest scope consistent with the new principles and features disclosed herein.

What is claimed is:

1. A portable display device comprising:
   a display; and
   a controller configured to:
   store a storage path of a first video and a storage path of a second video, wherein the first and second videos are related to at least two rotation states of the display;
   store a video playback time at a moment at which a rotation state of the display changes during playback of the first video; and
   control the second video to be played at a playback start time based on the storage path of the second video related to a detected rotation state of the display,
   wherein the playback start time is determined based on the stored video playback time,
   wherein the playback start time is determined to be after a video transition period, and
   wherein the video transition period starts when the display is rotated beyond a predetermined first angle, and ends when the display is rotated beyond a predetermined second angle.

2. The portable display device of claim 1, wherein the controller is configured to control a speaker to continuously output audio signals of the first or second video during the video transition period.

3. The portable display device of claim 2, wherein the playback start time is determined by adding a length of the video transition period to the stored video playback time.

4. The portable display device of claim 1, wherein the second video is obtained by enlarging a portion of the first video, and
   wherein the second video has a same playback duration as the first video.

5. The portable display device of claim 1, wherein the at least two rotation states comprise:
   a state in which the display is mounted horizontally; and
   a state in which the display is mounted vertically.

6. The portable display device of claim 1, wherein the playback of the first video is paused when the video transition period starts.

7. The portable display device of claim 1, wherein the controller is configured to:
   detect whether a new video theme is selected during playback of the first or second video; and
   play a video for the new video theme based on a detected rotation state of the display and a storage path of the video for the new video theme, in response to the selection of the new video theme.

8. A method of controlling a portable display device, the method comprising:
   wherein the portable display device is configured to store a storage path of a first video and a storage path of a second video, wherein the first and second videos are related to at least two rotation states of a display,
   storing a video playback time at a moment at which the rotation state of the display changes during playback of the first video; and
   controlling the second video to be played at a playback start time based on the storage path of the second video related to a detected rotation state of the display,
   wherein the playback start time is determined based on the stored video playback time,
   wherein the playback start time is determined to be after a video transition period, and
   wherein the video transition period starts when the display is rotated beyond a predetermined first angle, and ends when the display is rotated beyond a predetermined second angle.

9. The method of claim 8, comprising controlling a speaker to continuously output audio signals of the first or second video during the video transition period.

10. The method of claim 9, wherein the playback start time is determined by adding a length of the video transition period to the stored video playback time.

11. The method of claim 8, wherein the second video is obtained by enlarging a portion of the first video, and
    wherein the second video has a same playback duration as the first video.

12. The method of claim 8, wherein the at least two rotation states comprise:
    a state in which the display is mounted horizontally; and
    a state in which the display is mounted vertically.

13. The method of claim 8, wherein the playback of the first video is paused when the video transition period starts.

14. The method of claim 8, comprising:
    detecting whether a new video theme is selected during playback of the first or second video; and
    playing a video for the new video theme based on a detected rotation state of the display and a storage path of the video for the new video theme, in response to the selection of the new video theme.

15. A non-transitory computer-readable recording medium having stored thereon a computer program configured to perform the method of claim 8.

* * * * *